(12) United States Patent
Ward et al.

(10) Patent No.: US 11,377,245 B2
(45) Date of Patent: Jul. 5, 2022

(54) PRE-PERFORATED SUBSTRATE SEPARATOR AND INSERTION DEVICE FOR FOOD PREPARATION LINE AND PRE-PERFORATED SUBSTRATE

(71) Applicant: Packaging Progressions, Inc., Souderton, PA (US)

(72) Inventors: Andrew Ward, Limerick, PA (US); John Capps, North Wales, PA (US); Dante Pietrinferni, Douglassville, PA (US)

(73) Assignee: PACPROINC, LLC, Souderton, PA (US)

( * ) Notice: Subject to any disclaimer, the term of this patent is extended or adjusted under 35 U.S.C. 154(b) by 289 days.

(21) Appl. No.: 16/859,276

(22) Filed: Apr. 27, 2020

(65) Prior Publication Data
US 2020/0346805 A1 Nov. 5, 2020

Related U.S. Application Data

(60) Provisional application No. 62/842,799, filed on May 3, 2019.

(51) Int. Cl.
| | |
|---|---|
| *G06F 15/00* | (2006.01) |
| *G06F 3/12* | (2006.01) |
| *G06K 1/00* | (2006.01) |
| *B65B 35/44* | (2006.01) |
| *A22C 17/00* | (2006.01) |
| *B65B 25/08* | (2006.01) |
| *B65H 5/06* | (2006.01) |

(52) U.S. Cl.
CPC .......... *B65B 35/44* (2013.01); *A22C 17/0093* (2013.01); *B65B 25/08* (2013.01); *B65H 5/06* (2013.01)

(58) Field of Classification Search
CPC ..... B65B 35/44; B65B 25/08; A22C 17/0093; B65H 5/06
USPC ................................ 358/1.15, 1.14, 1.13, 1.1
See application file for complete search history.

(56) References Cited

U.S. PATENT DOCUMENTS

| | | | |
|---|---|---|---|
| 4,236,855 A | 12/1980 | Wagner et al. | |
| 5,768,857 A | 6/1998 | Ward et al. | |
| 2005/0039585 A1* | 2/2005 | Battisti | B65H 29/00 83/13 |
| 2019/0210383 A1* | 7/2019 | Lee | B65H 7/02 |

FOREIGN PATENT DOCUMENTS

| | | |
|---|---|---|
| EP | 0 376 754 A1 | 7/1990 |
| EP | 0 376 754 A2 | 7/1990 |
| GB | 672742 | 10/1950 |
| WO | 2009/149322 A1 | 12/2009 |

OTHER PUBLICATIONS

Extended European Search Report for EP 20 17 2584, dated Sep. 15, 2020, 5 pp.

* cited by examiner

*Primary Examiner* — Douglas Q Tran
(74) *Attorney, Agent, or Firm* — Crowell & Moring LLP

(57) ABSTRACT

A substrate insertion system is configured for insertion of a substrate under a product being carried on a conveyor. A pre-perforated substrate and a method of inserting the pre-perforated substrates under products carried on a conveyor are also provided. Furthermore, a method is described including the construction and operation of a substrate insertion system.

13 Claims, 6 Drawing Sheets

PRE-PERFORATED SUBSTRATE SEPARATOR AND INSERTION DEVICE FOR FOOD PREPARATION LINE AND PRE-PERFORATED SUBSTRATE

CROSS-REFERENCE TO RELATED APPLICATION

This application is a non-provisional application which claims priority to U.S. provisional application Ser. No. 62/842,799, filed May 3, 2019, which is incorporated by reference herein in its entirety.

BACKGROUND OF THE INVENTION

The present invention relates to substrate insertion devices used in connection with food preparations, specifically for inserting a substrate beneath food preparations as they travel along a conveyor path.

Food setups, meat patties and other food items are placed on substrates so that the setup, patty or other item can be stacked one on top of another for packaging in trays without the risk of the food items becoming intermixed or stuck together. Food setups may include sliced meats and cheeses, such as those used in sandwiches so that a food preparer can simply remove a setup and place it in a sandwich. Meat patties are typically hamburger, turkey burger or other types of patties which are formed and then stacked one upon the other prior to being placed in a tray and wrapped.

It has been known to use an interleaver or paper placer for placing a substrate between the food setup, meat patty, or other item. Several known interleavers use roll stock for the substrate which is required to be cut to length and then inserted using a number of rollers that define nips that carry the substrate to an insertion point in the conveyor line, usually formed as a gap between two conveyors. A detector senses the product to be interleaved on the conveyor line, and the roll stock is advanced, cut, and then inserted or interleaved under the product as it crosses the gap. Given the high speeds of some production lines, which can require up to 300 products per minute being interleaved, controls are required for tensioning and guiding the substrate coming off the roll, and ensuring the proper timing for the cutting and transport operation to the point where the substrate is inserted. These known interleavers can be expensive and may occupy a substantial space along a food preparation line.

There is the need for a more cost effective substrate interleaver/inserter which can be used in connection with food production lines that is simple to use and install and which can be easily integrated into existing production lines.

SUMMARY

Briefly stated, a substrate insertion system for insertion of a substrate under a product being carried on a conveyor, in particular under a food product being carried on a food processing line conveyor, is provided. The insertion system includes a support frame, which can be separate or part of the conveyor line, and a substrate path for substrate that is to be fed. Pull rollers are mounted to the frame along the substrate path, with the pull rollers defining a pull roller nip through which the substrate is fed. Tear rollers are also mounted to the frame along the substrate path, with the tear rollers defining a tear roller nip through which the substrate is fed. The tear rollers are downstream along the substrate path from the pull rollers. At least one pull roller drive and at least one tear roller drive are provided, with the pull roller drive and the tear roller drive being configured to be driven at different speeds. A controller controls the at least one pull roller drive and the at least one tear roller drive. A product sensor is located along a product path defined by the conveyor. A pre-perforated substrate supply is provided in a substrate box, with the substrate box including first and second opposing pairs of sidewalls and a top cover. The first opposing pair of sidewalls define a first side-to-side guidance for the pre-perforated fan-fold substrate, and the top cover defines an opening having a length that is less than 50% of a length of a leaf of the pre-perforated substrate supply, with the leafs being arranged in a fan-folded manner in the substrate box.

In use, the pre-perforated substrate supply is fed through the pull roller nip, and indexed to a starting point provided by a leading edge locator located along the substrate path downstream from the pull roller nip. The product sensor detects a product traveling on a product conveyor and signals the controller. The controller activates the pull roller drive and the tear roller drive based on a timing for the product to arrive at a substrate insertion point located at a gap in the product conveyor line. The substrate supply advances along the substrate path in accordance with the required timing, the pull roller drive is stopped such that the tear rollers which continue to drive, separate a single substrate sheet from the substrate supply by rupturing the perforated connection of the lead sheet, which is pulled forward through the tear roller nip and inserted through the gap and beneath the product as it travels across the gap. This process continues for each sensed product. The substrate box acts to apply tension on the substrate supply, eliminating the need for dancer bars or other substrate supply feed sensors or drives. Sensors used for determining the position of the substrate along the substrate feed path can also be eliminated by using servo motors for the pull roller and tear roller drives since these allow for precise tracking of the substrate position once the leading edge of the substrate supply is indexed to the starting point. Accordingly a simple control system can be used that only relies on the product sensor and the speed of the product conveyor in order to insert single substrates.

In another aspect, each substrate of the pre-perforated substrate supply is preferably connected to at least one adjacent substrate by a plurality of tabs located between trimmed corners prior to being inserted. Here, since the substrate supply is pre-perforated and provided in fan form in the substrate box, it is also possible to provide trimmed corners on each substrate. This is advantageous in food packaging applications since the corners of square or rectangular substrates sometimes extend into the sealing area for the stacked products requiring re-work or unusable packaged product, for example for stacked meat patties separated by substrates, if a substrate corner extends into the seal area for the wrapping material for the stacked product, it has to be manually removed from the processing line and re-packaged, or the product is discarded as unusable. The trimmed corners can be angled or rounded.

Preferably, the top cover of the substrate box is formed by a top flap of the box. The top cover is adapted to apply friction to the pre-perforated substrate supply that is drawn from the substrate box. The opening in the substrate box has a width defined by a distance between an inside of the first opposing pair of sidewalls, and thus corresponds to and acts as part of the first side-to-side guidance.

A second side-to-side guidance for the pre-perforated fan-fold substrate formed by projections on a turning bar along the substrate path around which the substrate supply travels.

Preferably, positioning guides are provided that are located on the frame that are adapted to position the substrate box.

A method of inserting substrates under products being carried on a conveyor is also provided, and includes providing a substrate insertion system for insertion of a substrate under a product being carried on a conveyor having one or more features of the invention described herein, driving the pull rollers with the pull roller drive to advance the pre-perforated substrate supply along the substrate path to a predetermined position, sensing a product traveling on the conveyor with the product sensor at a defined position and signaling the controller to advance the pre-perforated substrate supply a predetermined distance via the pull rollers at a predetermined time such that the pre-perforated substrate supply is engaged by the tear roller nip between the tear rollers, separating a single substrate from the pre-perforated substrate supply by stopping the pull rollers, and the tear rollers advancing the single substrate separated from the pre-perforated substrate supply along the substrate path and inserting the single substrate beneath the product as it travels across a gap along a product path on the conveyor.

When used in connection with a food product line, such as meat patties, the food product with its associated substrate after substrate insertion, is stacked in the stacker and placed in trays for further packaging and/or processing.

BRIEF DESCRIPTION OF THE DRAWINGS

The foregoing summary as well as the following detailed description which will be best understood when reviewed in conjunction with the drawings, which illustrate a presenting preferred embodiment of the invention.

DETAILED DESCRIPTION

Figure 1:
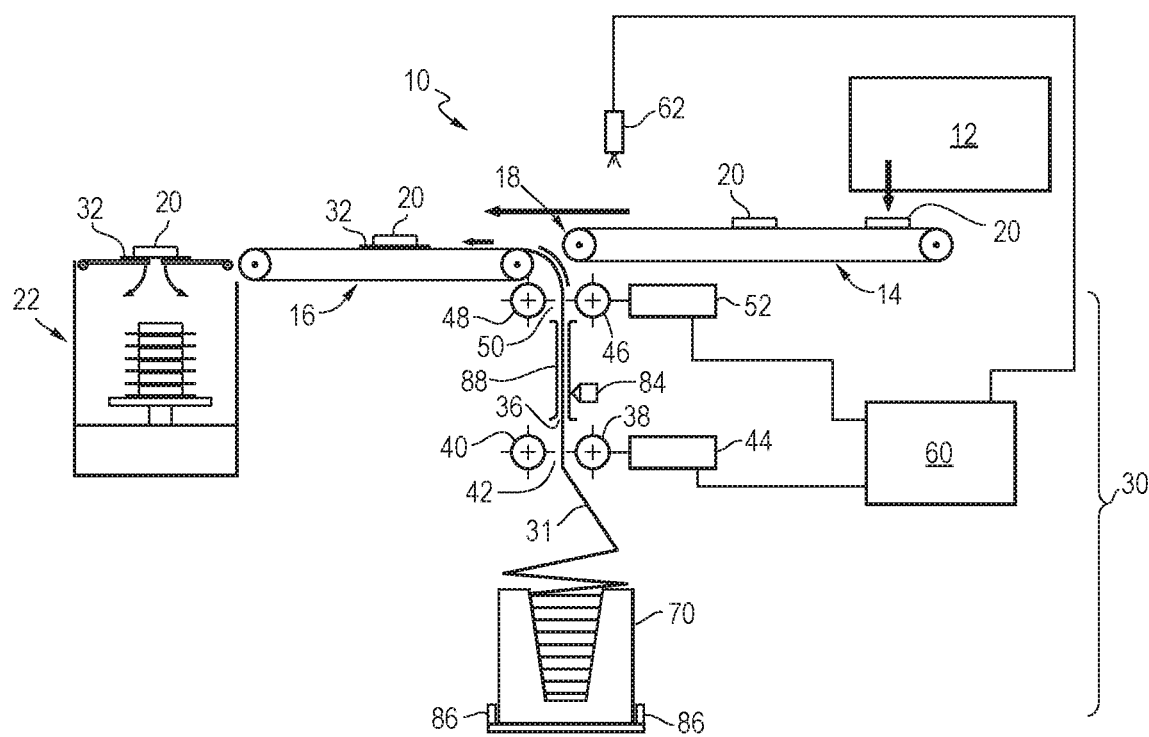
FIG. 1 is a schematic view of a food production line including a substrate insertion system.

Certain terminology is used in the following description for convenience only and is not considered limiting. Words such as "up", "down", "left", and "right" are used for convenience only in describing the directions of certain features noted in the drawings, and are not considered limiting. Additionally, the words "a" and "one" are defined as including one or more of the referenced items unless specifically noted.

Referring to FIG. 1, a food production line 10 is shown schematically in connection with a substrate insertion system 30 that inserts a substrate 32 under a product 20 that is being carried on a conveyor 14, 16 of the food production line 10. The substrate insertion system 30 is preferably used in connection with a food production line 10. However, it can be used in other applications where a substrate 32 must be placed under a product 20 that is being carried along a conveyor 14, 16.

As schematically shown in FIG. 1, the substrate insertion system 30 inserts a substrate 32 through a gap 18 formed in the product conveyor between an upstream conveyor 14 and a downstream conveyor 16. This is done in time with the product 20 traveling over the gap 18. In the food production line 10 shown, the product 20 now placed on a substrate 32 is carried to a stacker 22 where the product and substrate are stacked for further packaging or processing.

The substrate insertion system 30 includes a support frame 34 shown at least in part in FIGS. 2-6. This can be part of an existing conveyor system or can be a separate frame. A substrate path 36 for the substrate 32 that is to be fed is defined between rollers and guides, as described in further detail below. Specifically, a set of pull rollers 38, 40 is mounted to the frame 34 along the substrate path 36. These pull rollers 38, 40 define a pull roller nip 42 through which the substrate 32 is fed. A set of tear rollers 46, 48 are mounted to the frame 34 further along the substrate path 36. The tear rollers 46, 48 define a tear roller nip 50 through which the substrate 32 exiting the pull roller nip 42 is fed. Wire guides, for example as shown at 88 in FIG. 1, can be provided along the substrate path 36 in order to help guide the substrate as it is supplied.

A pull roller drive 44 and a tear roller drive 52 are provided and associated with the set of pull rollers 38, 40 and the set of tear rollers, 46, 48, respectively. Typically on a single roller of a given set is driven. However, it would be possible to drive both rollers in each set. The pull roller drive 44 and the tear roller drive 52 are configured to be driven at the same or at different speeds. For example, the pull roller drive 44 can be switched off and on and the tear roller drive 52 can be run continuously in order to allow a substrate 32 that enters the tear roller nip 50 to be separated from the remainder of the substrate supply 31 as a single substrate sheet for placement beneath the product 20 through the gap 18 as shown in FIG. 1. This is done in a timed manner with the product 20 being carried along the conveyor 14, 16 as described in further detail below in order to provide proper placement of the product 20 on the individual substrate 32. Alternatively, the pull roller drive 44 and the tear roller driver 52 can both be continuously driven at differing speeds to provide for higher speed placement of the substrates 32, with the pull roller drive 44 decelerating in a specifically timed manner in order to allow a sufficient difference in the speeds between the tear roller drive 52 and the pull roller drive 44 to cause a separation of the individual substrate 32 from the substrate supply 31 so that it can be fed through the gap 18 beneath the product 20 while not entirely stopping the feeding of the substrate supply 31.

Preferably, the pull roller drive 44 is a servo motor and the tear roller drive is also a separate servo motor. Servo motors allow for precise control of the rotation of the associated pull rollers 38, 40 or tear rollers 46, 48 so that the position of the substrate supply 31 as well as the separated individual substrates 32 can be accurately tracked without the need for separate tracking sensors along the substrate path 36.

Referring again to FIG. 1, a controller GO controls the pull roller drive 44 and the tear roller drive 52 in order to control the timing of the insertion of individual substrates 32 separated from the substrate supply 31. The controller GO may be a PLC or may be microprocessor based, and may include a programmable memory.

Figure 2:
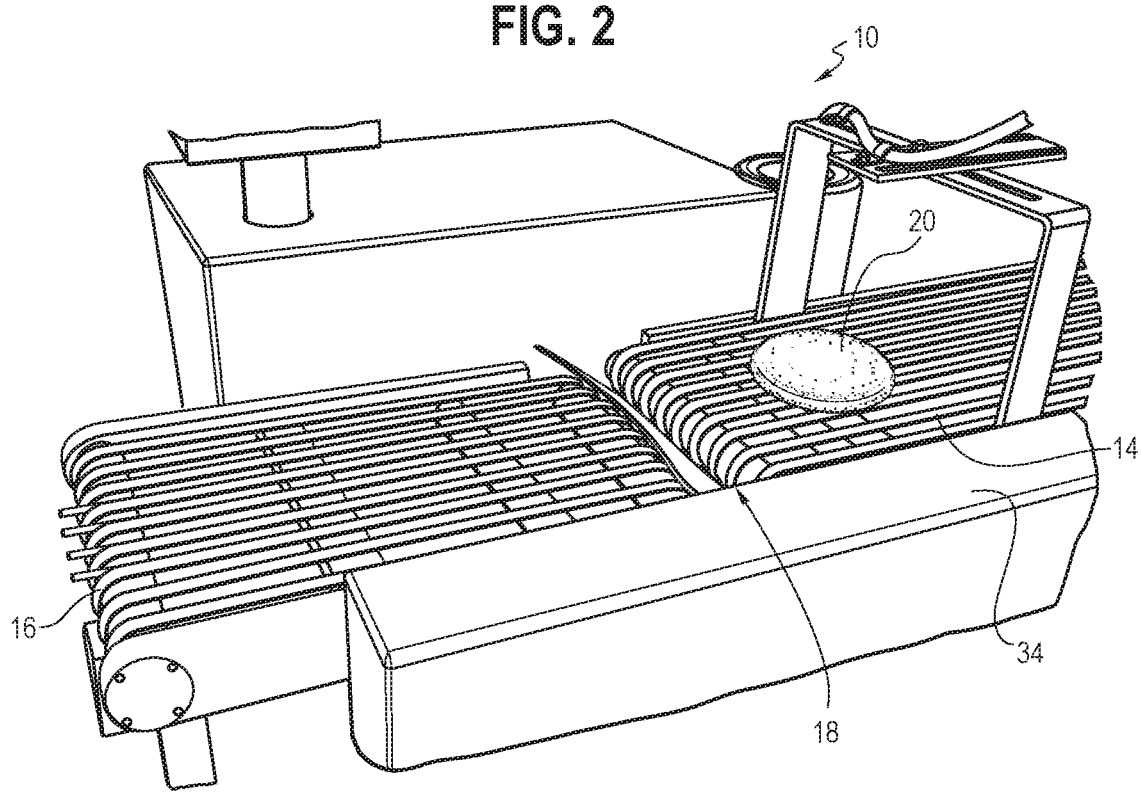
FIG. 2 is a top view showing a product traveling along a conveyor of the food production line.
Figure 3:
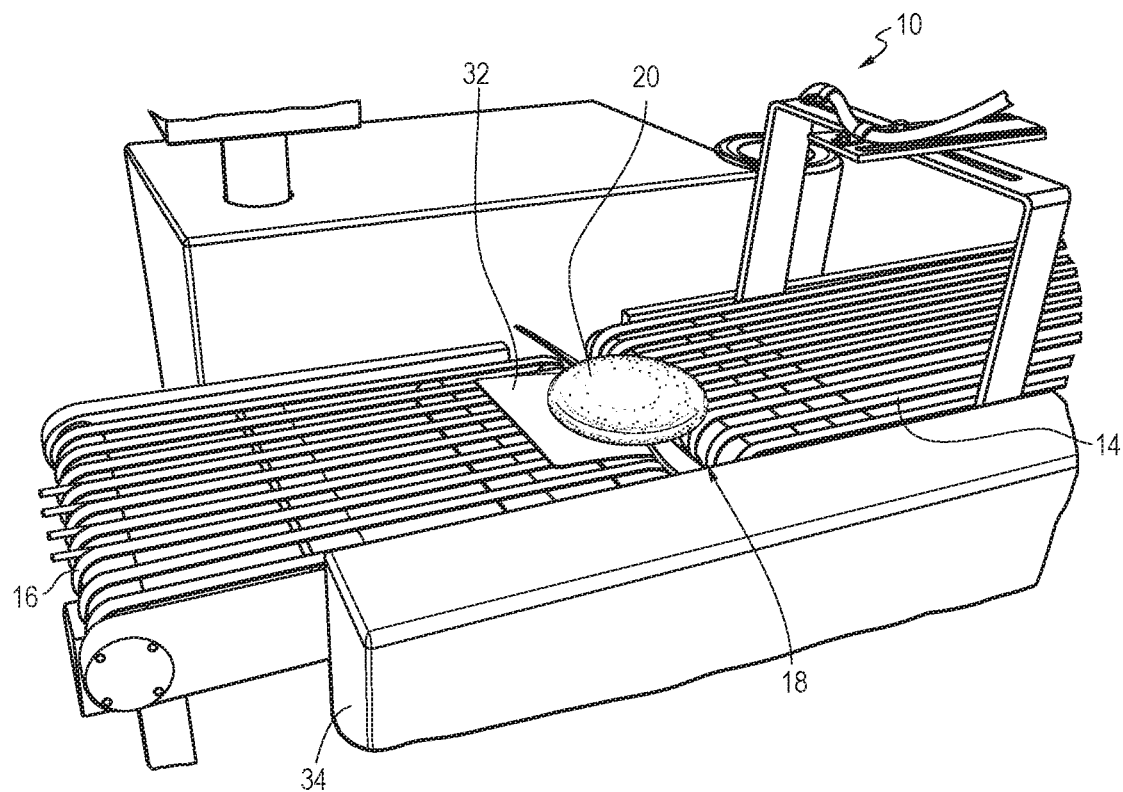
FIG. 3 is a top view similar to FIG. 2 showing the product traveling over a gap in the conveyor path and a substrate being inserted through the gap and beneath the product.
Figure 4:
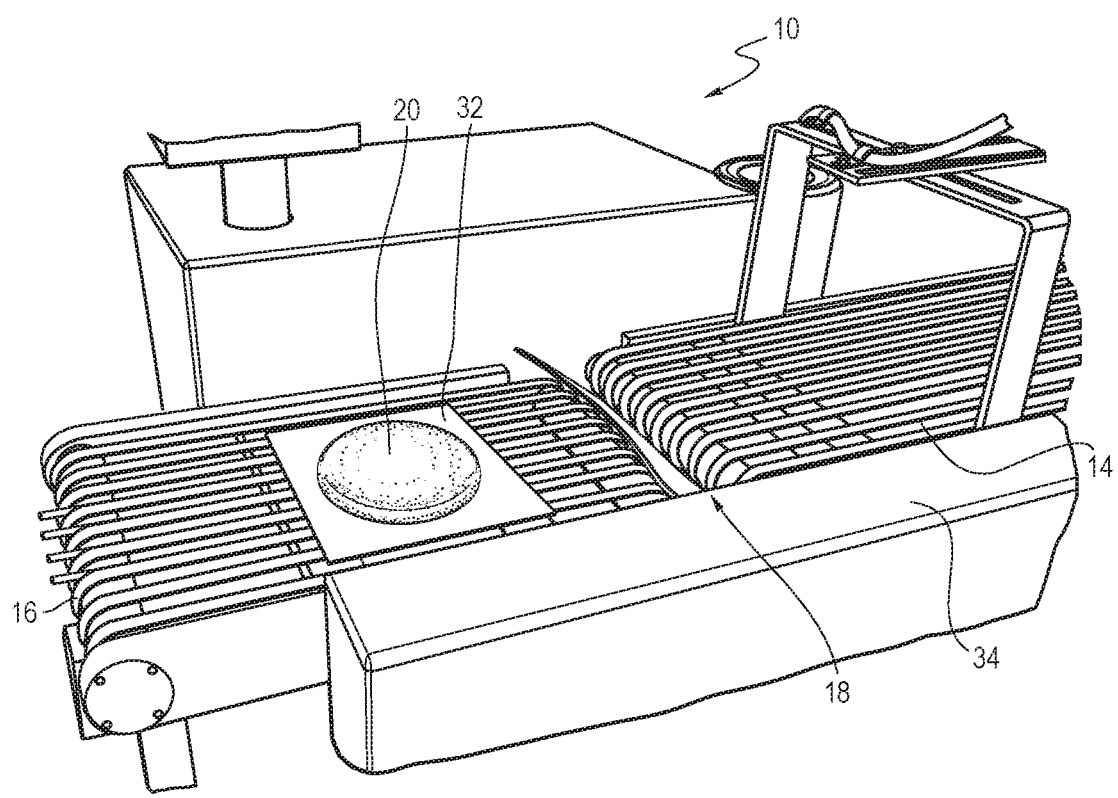
FIG. 4 is a view similar to FIGS. 2 and 3 showing the product on the substrate continuing to travel along the conveyor for further processing.
Figure 5:
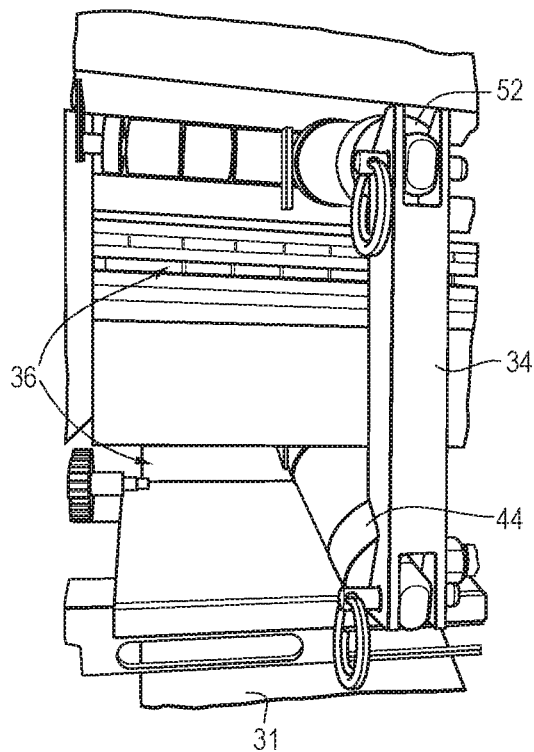
FIG. 5 is a view showing the substrate insertion system taken beneath the product conveyor.

A sensor 62 is located along the product path defined by the conveyor 14, 16. This can be a break beam sensor that detects a position of the product 20 as it is carried along the upstream conveyor 14 which signals the controller GO that a substrate 32 needs to be inserted through the gap 18 beneath the product 20. The controller 60 actuates the pull roller drive 44 and the tear roller drive 52 in order to advance the substrate supply 31 a sufficient amount and then, preferably stops the pull roller drive 44 so that the tear roller drive 52 continues to advance the substrate supply 31, separating a single substrate 32 from the substrate supply 31 and inserting it beneath the product 20 in time with the product 20 passing over the gap 18 between the upstream and downstream conveyors 14, 16. The insertion is shown in the sequence of FIGS. 2, 3, and 4 with the product 20 traveling from the upstream conveyor 14 to the downstream conveyor 16 as the single substrate 32 is inserted beneath the product.

Figure 9:
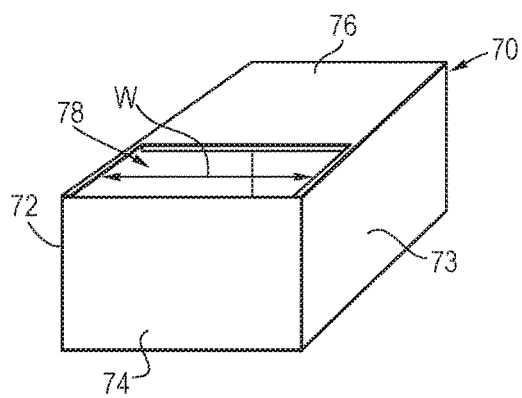
FIG. 9 is a detailed view of an embodiment of the substrate box.
Figure 10:
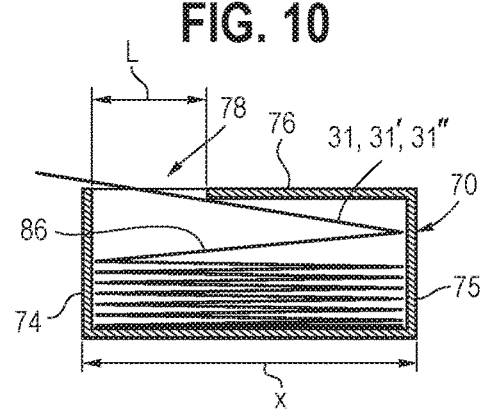
FIG. 10 is a cross-sectional view taken through the substrate box of FIG. 9 showing the fan-folded substrate leafs arranged in the substrate box with the substrate supply exiting through a cover opening in the substrate box.

A pre-perforated substrate supply 31 is provided in a substrate box 70. The preferred embodiments of the pre-perforated substrate supply 31, 31', 32" are shown in detail in FIGS. 11-13 while a preferred substrate box 70 is shown in FIGS. 9 and 10. The substrate box 70 preferably includes first and second opposing pairs of sidewalls 72, 73; 74, 75 and a top cover 76. A bottom is preferably also provided. The first opposing pairs of sidewalls 72, 73 define a first side-to-side guidance for the pre-perforated substrate supply 31. This is created by a spacing of the substrate supply 31 at 0.25 inches or less from each of the sidewalls 72, 73. The top cover 76 defines an opening 78, shown in detail in FIGS. 9 and 10, having a length L that is less than 50% of a length X of a leaf 86 of the pre-perforated substrate supply 31. These leafs 86 are arranged in a fan-folded manner in the substrate box 70 as shown in FIG. 10 and schematically represented in FIG. 1. The length of a single leaf 86 can correspond to a length of a single substrate, or there can be multiple single substrates 32 (still connected together at the perforation lines) per leaf 86.

Figure 11:
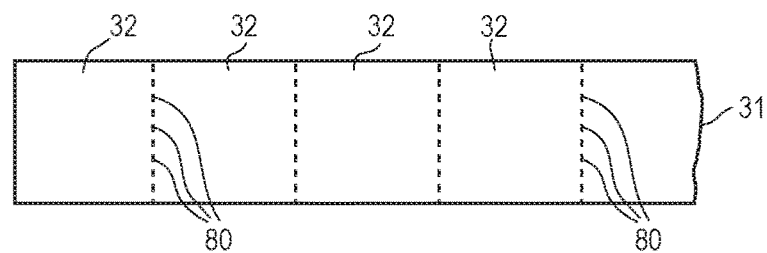
FIG. 11 is a plan view showing a portion of a first embodiment of a pre-perforated substrate supply.
Figure 12:
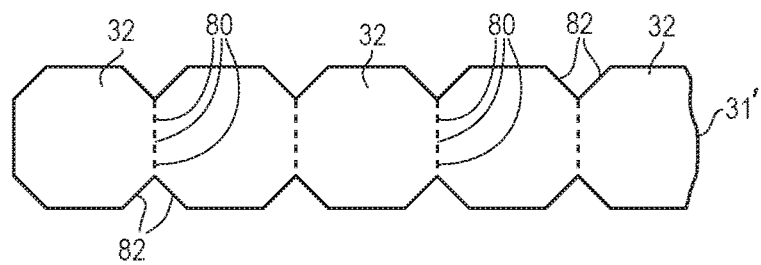
FIG. 12 is a plan view showing a second embodiment of a pre-perforated substrate supply.
Figure 13:
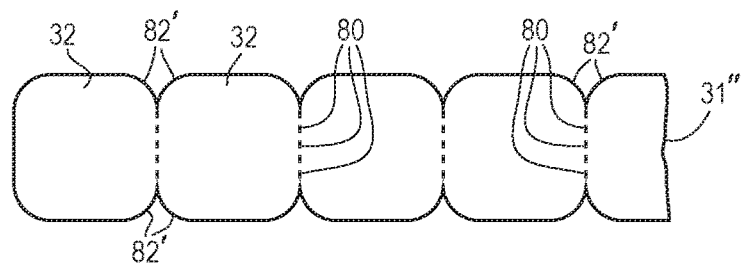
FIG. 13 is a plan view showing a third embodiment of a pre-perforated substrate supply.

As shown in FIGS. 11-13, each said substrate 32 of the pre-perforated substrate supply 31 is connected to at least one adjacent substrate 32 by a plurality of tabs 80 located between the substrates 32 formed by perforations. One or more of the individual substrates 32 defined between these perforation lines can form a leaf 86 as provided in the substrate box 70.

As shown in FIGS. 12 and 13 in connection with the substrate supply embodiments 31' and 31", the individual substrates can have trimmed corners 82, 82' that are formed at the same time as the perforations when the pre-perforated substrate 31', 31" is being manufactured. As shown, the trimmed corners 82 are angled and the trimmed corners 82' are rounded. These provide several advantages in connection with further processing and packaging of food products that are stacked on the substrates 32 in that there are no corners which can interfere with further wrapping and sealing of stacked product.

In the preferred embodiment, the substrate box 70 is provided as a consumable along with the pre-perforated substrate supply 31, and the top cover 76 is formed by a top flap of the box 70. The opening 78 can be created by either cutting or removing a portion of the flap that is defined by markings on the substrate box 70. Preferably, the opening 70 has a width W, shown in FIG. 9, defined by a distance between an inside of the first opposing pair of sidewalls 72, 73. The length L of the opening is preferably less than 50% of the length X of a leaf 86, and is more preferably less than 40%, and can be less than 30%. The top cover 76 is adapted to apply friction to the pre-perforated substrate supply 31 that is drawn from the substrate box 70.

Figure 6:
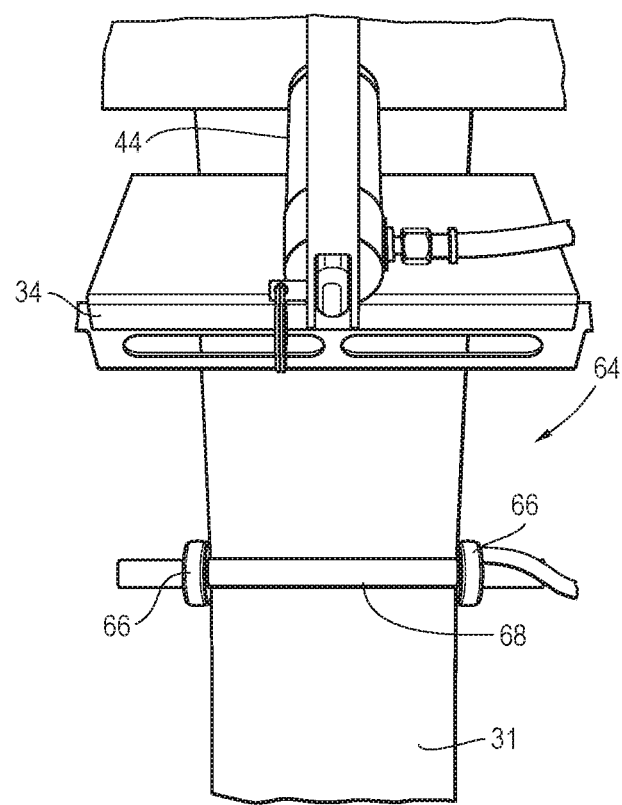
FIG. 6 is an additional view of the substrate insertion system taken beneath the conveyor showing a side-to-side guidance for the substrate supply.
Figure 7:
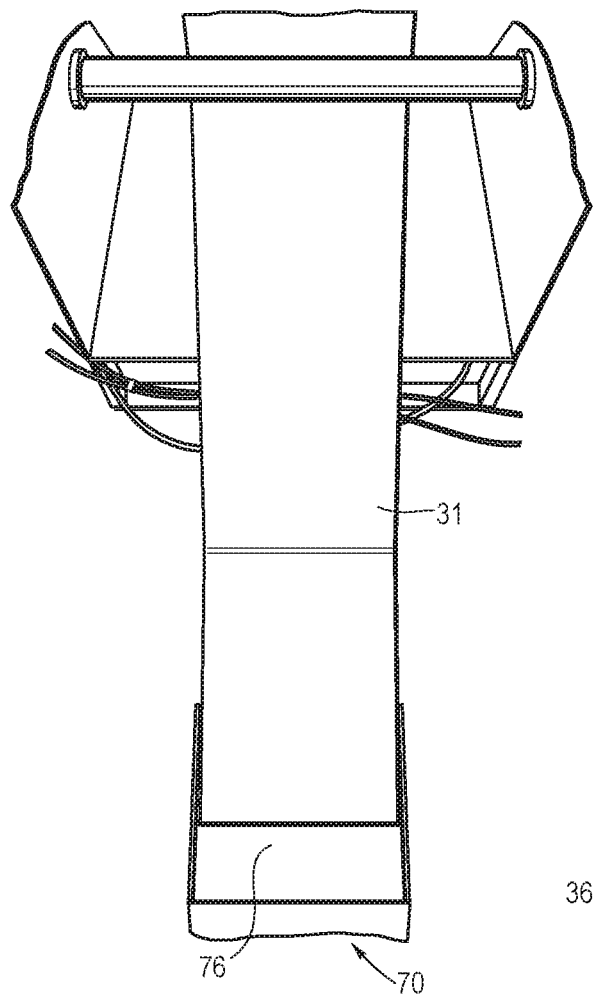
FIG. 7 is a view of the substrate insertion system showing the substrate leaving the substrate box.
Figure 8:
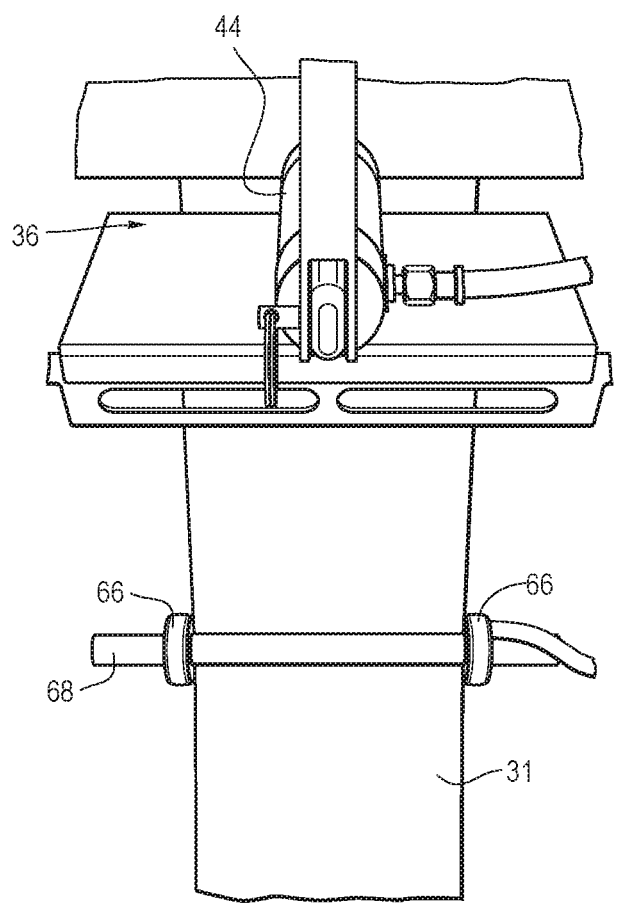
FIG. 8 is an additional view of the substrate insertion system taken below the conveyor showing the substrate supply traveling toward the pull rollers.

Depending upon the particular application, as shown in FIGS. 6 and 8, a second side-to-side guidance 64 can be provided along the substrate path 36. This is shown as a turning bar 68 along the substrate path 36 around which the substrate supply 31 travels. Projections 66, in the form of rings, are located on the turning bar 68 in order to provide side-to-side tracking for the substrate supply 31 being fed along the substrate path 36.

In the substrate insertion system 30, preferably the pull roller drive 44 and the tear roller drive 52 are provided as servo motors and accordingly, tracking sensors for the position that is substrate supply 31 are not required. Instead, the position is tracked via the servo motors and the controller GO. However, when the substrate supply 31 is first installed, the leading edge of the substrate supply 31 is required to be fed through the pull roller nip 42 and indexed at a leading edge locator 84, shown in FIG. 1, so that the system can initiate with a known position of the leading edge of the substrate supply 31. This can be a visual marker or target that the operator can visually use to set the position of the leading edge of the pre-perforated substrate supply 31.

Additionally, as shown in FIG. 1, positioning of the substrate box 70 is also controlled via guides 86 located on the frame 84 that are adapted to position of the substrate box 70 in a repeatable manner.

A method for inserting substrates 32 under products being products carried on a conveyor 14, 16 is also provided. The method includes providing the substrate insertion system 30 including one or more features as discussed above. The pull rollers 38, 40 are driven with the pull roller drive 44 to advance the pre-perforated substrate supply 31 along the substrate path 36 to a predetermined position. The sensor 62 senses a product 20 traveling on the conveyor 14, 16 at a defined position and signals the controller 60 to advance the pre-perforated substrate supply 31 a predetermined distance via the pull rollers 38, 40 at a predetermined time such that the pre-perforated substrate supply 31 is engaged by the tear roller nip 50 between the tear rollers 46, 48. A single substrate 32 is separated from the pre-perforated substrate supply 31 by stopping the pull rollers 38, 40. Alternatively, separation can be achieved by decelerating the pull rollers 38, 40 to a slower speed than the tear rollers 46, 48. The tear rollers 46, 48 then advance the single substrate 32 separated from the pre-perforated substrate supply 31 by breaking the tabs 80 located between individual substrates on the pre-perforated substrate supply 31 and insert the single substrate 32 beneath the product 20 as it travels across the gap 18 along the product path on the conveyor 14, 16.

Having thus described in detail a preferred selection of embodiments of the present invention, it is to be appreciated and will be apparent to those skilled in the art that many physical changes could be made in the substrate insertion system without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. A substrate insertion system for insertion of a substrate under a product being carried on a conveyor, comprising: a support frame; a substrate path for substrate that is to be fed; pull rollers mounted to the support frame along the substrate path, the pull rollers defining a pull roller nip through which the substrate is fed; tear rollers mounted to the support frame along the substrate path, the tear rollers defining a tear roller nip through which the substrate is fed; a pull roller drive and a tear roller drive, the pull roller drive and the tear roller drive being configured to be driven at different speeds; a controller that controls the pull roller drive and the tear roller drive; a product sensor located along a product path defined by the conveyor; a pre-perforated substrate supply provided in a substrate box, the substrate box including first and second opposing pairs of sidewalls and a top cover, the first opposing pair of sidewalls defining a first side-to-side guidance for the pre-perforated substrate supply, and the top cover defining an opening having a length that is less than 50% of a length of a leaf of the pre-perforated substrate supply, said leafs being arranged in a fan-folded manner in the substrate box.

2. The substrate insertion system of claim 1, wherein each said substrate of the pre-perforated substrate supply is connected to at least one adjacent substrate by a plurality of tabs located between trimmed corners prior to being inserted.

3. The substrate insertion system of claim 2, wherein the trimmed corners are angled.

4. The substrate insertion system of claim 2, wherein the trimmed corners are rounded.

5. The substrate insertion system of claim 1, wherein the top cover is formed by a top flap of the box.

6. The substrate insertion system of claim 1, wherein the opening has a width defined by a distance between an inside of the first opposing pair of sidewalls.

7. The substrate insertion system of claim 1, further comprising a second side-to-side guidance for the pre-perforated substrate formed by projections on a turning bar along the substrate path around which the substrate supply travels.

8. The substrate insertion system of claim 1, wherein the pull roller drive comprises a servo motor.

9. The substrate insertion system of claim 1, wherein the tear roller drive comprises a servo motor.

10. The substrate insertion system of claim 1, further comprising a leading edge locator located along the substrate path downstream of the pull roller nip for setting an initial substrate position at a leading edge of the pre-perforated substrate supply.

11. The substrate insertion system of claim 1, wherein the top cover is adapted to apply friction to the pre-perforated substrate supply that is drawn from the substrate box.

12. The substrate insertion system of claim 1, further comprising positioning guides located on the support frame that are adapted to position the substrate box.

13. A method of inserting substrates under products being carried on a conveyor, the method comprising:
providing a substrate insertion system for insertion of a substrate under a product being carried on a conveyor, said substrate insertion system including a support frame, a substrate path for substrate that is to be fed, pull rollers mounted to the support frame along the substrate path, the pull rollers defining a pull roller nip through which the substrate is fed, tear rollers mounted to the support frame along the substrate path, the tear rollers defining a tear roller nip through which the substrate is fed, at least one pull roller drive and at least one tear roller drive, with the at least one pull roller drive and the at least one tear roller drive being configured to be driven at different speeds, a controller that controls the at least one pull roller drive and the at least one tear roller drive, a product sensor located along a product path defined by the conveyor, and a pre-perforated substrate supply provided in a substrate box, the substrate box including first and second opposing pairs of sidewalls and a top cover, the first opposing pair of sidewalls defining a first side-to side guidance for the pre-perforated fan-fold substrate, and the top cover defining an opening having a length that is less than 50% of a length of a leaf of the pre-perforated substrate supply, said leafs being arranged in a fan-folded manner in the substrate box;
driving the pull rollers with the at least one pull roller drive to advance the pre-perforated substrate supply along the substrate path to a predetermined position;
sensing a product traveling on the conveyor with the product sensor at a defined position and signaling the controller to advance the pre-perforated substrate supply a predetermined distance via the pull rollers at a predetermined time such that the pre-perforated substrate supply is engaged by the tear roller nip between the tear rollers;
separating a single substrate from the pre-perforated substrate supply by stopping the pull rollers; and
the tear rollers advancing the single substrate separated from the pre-perforated substrate supply along the substrate path and inserting the single substrate beneath the product as it travels across a gap along a product path on the conveyor.

* * * * *